United States Patent [19]

Abell

[11] Patent Number: 5,731,260
[45] Date of Patent: Mar. 24, 1998

[54] BINDING OF SORBENT IN ASSEMBLING SOLID SORPTION COMPRESSOR CORES

[75] Inventor: George Abell, Claremont, Calif.

[73] Assignee: Aerojet-General Corporation, Rancho Cordova, Calif.

[21] Appl. No.: 600,433

[22] Filed: Feb. 13, 1996

[51] Int. Cl.$^6$ .............................. B01J 20/02; F17C 7/04; F28D 15/00
[52] U.S. Cl. ..................... 502/416; 502/423; 62/48.1; 165/104.12
[58] Field of Search ..................... 62/48.1; 165/104.12; 502/416; 302/423; 106/287.13, 287.14

[56] References Cited

U.S. PATENT DOCUMENTS

| | | | |
|---|---|---|---|
| 3,391,234 | 7/1968 | Walenciak et al. | 264/117 |
| 3,951,859 | 4/1976 | Inaba et al. | 252/430 |
| 3,960,761 | 6/1976 | Burger et al. | 252/421 |
| 3,978,000 | 8/1976 | Schmitt, Jr. et al. | 252/477 |
| 4,000,236 | 12/1976 | Redfarn et al. | 264/112 |
| 4,076,892 | 2/1978 | Fennimore et al. | 428/407 |
| 4,574,874 | 3/1986 | Duran | 165/43 |
| 4,638,646 | 1/1987 | Koseki et al. | 62/478 |
| 4,677,086 | 6/1987 | McCue et al. | 502/62 |
| 4,709,558 | 12/1987 | Matsushita et al. | 62/480 |
| 4,759,191 | 7/1988 | Thomas et al. | 62/101 |
| 4,799,360 | 1/1989 | Retallick et al. | 62/48 |
| 4,857,243 | 8/1989 | Von Blucher et al. | 264/13 |
| 5,018,368 | 5/1991 | Steidl et al. | 62/480 |
| 5,042,259 | 8/1991 | Jones | 62/46 |
| 5,048,301 | 9/1991 | Sabin et al. | 62/101 |
| 5,250,605 | 10/1993 | Hazan et al. | 524/504 |
| 5,325,916 | 7/1994 | Dunne et al. | 165/104 |
| 5,380,553 | 1/1995 | Loboda | 427/226 |
| 5,388,637 | 2/1995 | Jones et al. | 165/104.12 |

Primary Examiner—Elizabeth Wood
Assistant Examiner—Tanaga A. Boozer
Attorney, Agent, or Firm—Townsend and Townsend and Crew LLP

[57] ABSTRACT

Activated carbon is bonded to a thermally conductive solid support as a porous sorbent body by forming a carbon slip containing activated carbon particles and a low-temperature-curing binder in an oil-in-water emulsion, and curing the carbon slip in place against the solid support. Furthermore, a microporous monolithic carbonaceous body of fused or otherwise bonded activated carbon particles, which can consists strictly of activated carbon or of a mass of activated carbon particles bonded to a shaped open lattice-type or finned substrate structure, is bonded to a surface of a substrate which is generally complementary in contour to the carbonaceous body by applying a liquid-form heat-curable binder formulation to the contact surfaces. The binder formulation contains an inert liquid carrier or solvent. Once the surfaces are placed in contact and the system evacuated to a subatmospheric pressure, the binder formulation is heated to cause the carrier or solvent to boil such that the resulting agitation promotes further distribution of the binder along the contact surfaces without penetrating the porosity of the carbonaceous body. Curing of the binder then provides extensive heat transfer contact between the carbonaceous body and the substrate with substantially no loss of sorption capacity of the carbonaceous body.

33 Claims, No Drawings

BINDING OF SORBENT IN ASSEMBLING SOLID SORPTION COMPRESSOR CORES

This invention resides in the field of activated carbon and its use as a sorbent in heat transfer systems.

BACKGROUND OF THE INVENTION

The solid sorption compressor is a key component of certain types of refrigeration and air-conditioning systems. Where the working fluid is hydrogen, ammonia, natural gas or similar materials, a high capacity sorbent is needed, particularly one which will endure very rapid cycles of adsorption and desorption as well as wide and rapid thermal cycling. Ammonia-based systems, for example, typically involve thermal cycling between a low of 30° C. and a high of 200° C., and the typical compressor is expected to last over many thousands of such cycles.

Activated carbon is the sorbent of choice in many solid sorption compressors, particularly those using ammonia as the working fluid, because of the chemical inertness and high porosity that are characteristic of activated carbon. The efficiency of activated carbon as a sorbent is even greater when the carbon is formed into a high-density matrix whose porosity is concentrated in the particle interiors rather than in the void spaces between individual particles. In forming these matrices, carefully selected binders are used which bind the activated carbon particles into a coherent mass that both retains the porosity of the particles and is durable enough to withstand the rigors of use without granulation or other disintegration.

A further important factor in achieving efficient heat transfer in solid sorption compressors is the efficiency of contact and heat transfer between the carbon matrix and the thermally conductive substrate that serves as the medium through which heat flows to and from the working fluid. The substrate is often in the form of fins or an open-lattice structure such as that of a foamed metal, both such structures in turn projecting from a primary heat exchange surface such as the inner or outer wall of a length of pipe. A binder is used here as well, to bind the carbon matrix to the surface of the fins or foamed metal, and similar considerations apply: wicking of the binder into the pores of the carbon must be minimized if not avoided entirely, yet the bond must be strong enough to withstand repeated thermal cycling, and extensive enough to permit heat exchange over the entire area of contact. In structures where the thermally conductive substrate is a retaining vessel of unusual size or shape and the carbon matrix (which may be a mass of activated carbon particles bonded to a shaped open lattice-type structure or a finned substrate structure) is formed prior to bonding to the substrate wall, the formation of the bond between substrate and matrix in a manner which provides full contact without comprising the porosity of the carbon matrix is even more difficult to achieve.

Much of the loss of porosity during the processing of activated carbon arises from high temperature exposure during the curing of the binder. The sintering of the carbon reduces the micropore component of the porosity, thus lowering the surface area and shifting the pore size distribution toward the larger-diameter regime. High temperature processing may also compromise structural materials if they are incorporated into the carbon/binder mixture prior to curing. Also, the hydrocarbon solvents typically used with conventional binder systems give rise to environmental considerations. Recovery of the solvent is often a costly process and one subject to regulatory review.

These and other problems are addressed by the present invention.

SUMMARY OF THE INVENTION

It has now been discovered that efficient bonding of activated carbon to a thermally conductive substrate can be achieved with little or no use of hydrocarbon solvent by using a binder which is applied prior to curing as an oil-in-water emulsion. The binder is one which is heat-curable and substantially insoluble in water but dispersed in an aqueous liquid. A slurry-like carbon slip can be formed by combining the binder emulsion with particles of granular activated carbon. The slip is then placed in contact with the thermally conductive substrate, either by coating the substrate with the slip, filling in gaps or open spaces in the substrate with the slip, or in the case of a foam or open-lattice substrate, impregnating the lattice with the slip. Water is then evaporated and curing is performed, resulting in a highly porous yet compact carbonaceous matrix securely bound to the substrate. Preferred binders are silicone binders curable at temperatures below about 250° C., and preferred substrates are metals such as aluminum and aluminum alloys.

A further discovery forming part of this invention is a method by which a preformed and shaped monolith or coherent body of carbonaceous material such as that formed by a bonded mass of activated carbon particles, or a mass of activated carbon particles bonded to a shaped open lattice-type or finned substrate structure, can be bonded to the surface of a substrate to which the coherent carbon body is complementary in shape, with full bonding along the entire area of contact and yet substantially no loss of carbon porosity. This is achieved by the use of a liquid mixture containing a heat-curable polymeric binder and a non-curable organic liquid that boils below about 200° C. The mixture is placed between the contacting surfaces of the carbonaceous body and the substrate, and the resulting composite is heated at subatmospheric pressure to boil off the organic liquid, thereby distributing the binder material evenly throughout the region of contact while the vapor escapes through the pores of the carbonaceous material. Heating is then continued as needed to cure the binder, and the result is a continuous bond between the carbonaceous material and the substrate with substantially no penetration of the binder into the pores of the carbonaceous material. The organic liquid is preferably a solvent in which the binder is dissolved.

The binder used in joining the preformed coherent carbonaceous body to the substrate may be the same as that used in the formation of the carbon slip described in the first paragraph under this section, but the two are not necessarily coextensive in the scope of appropriate binders, dispersing or dissolving media and other components of the binder formulation. For both aspects of the invention, further features and preferred embodiments will be apparent from the description that follows.

DETAILED DESCRIPTION OF THE INVENTION AND PREFERRED EMBODIMENTS

Activated carbon is a non-graphitic carbon in an microcrystalline structure containing six-member carbon rings separated by regions of disorganized carbon. The pore size distribution is generally described in terms of micropores, mesopores and macropores, as these terms are defined by the International Union of Pure and Applied Chemistry:

micropores being those of less than 2 nanometers in diameter, mesopores those of 2 to 50 nanometers in diameter, and macropores those of more than 50 nanometers in diameter. Preferred activated carbons for the purposes of the present invention are those having a substantial proportion of their pore volume in the microporous regime. One class of such activated carbons consists of those in which about 50% of their pore volume resides in pores smaller than 4 nanometers in diameter and in which the surface area, as measured by the well-known Brunauer-Emmet-Teller (BET) method (Brunauer, S., et al., *J. Am Chem. Soc.* 60:309–316 (1938)), is about 2000 m$^2$/g or greater. A more preferred class consists of those in which about 80% of the pore volume resides in pores smaller than 4 nanometers in diameter and in which the BET surface area is about 2500 m$^2$/g or greater.

One type of activated carbon suitable for use in practicing this invention is commercially available from The Kansai Coke & Chemicals Co. Ltd. (Amagasaki, Japan) under the designation "MAXSORB." A particularly preferred activated carbon of this type is the product designated as "MAXSORB 2400." Another type of suitable activated carbon is that described in U.S. Pat. No. 4,082,694 to Wennerberg, A. N., et al. (Amoco Corporation, Chicago, Ill.) and designated as "PX-21." When used in powder form in this invention, the activated carbon is preferably sized such that about 50% or more of the particles are within the size range of 5 to 50 microns as measured by the Coulter Counter technique.

Binders for use in this invention are polymeric materials which are heat-curable. The term "heat-curable polymeric binder" is used herein to include materials often referred to as prepolymers, particularly oligomers, which further polymerize to a hardened state. Examples of prepolymers and the cured polymers formed from them are polyacrylates, polyamides, urethanes, epoxies, phenolics, and silicones, both organic and inorganic. Preferred polymeric binders are silicones, and preferred silicones are those that cure at a temperature of about 250° C. or below. Those having cure temperatures within the range of about 125° C. to about 225° C., and particularly about 150° C. to about 200° C. are more preferred.

A particularly preferred subclass of silicones are silsesquioxanes. These are oligomers of repeating tetracyclosiloxane rings, generally represented by the following formula:

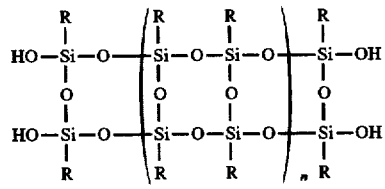

The various R's appearing in this formula can either represent the same radical throughout the formula or different radicals. In either case, each R is generally alkyl, alkenyl, alkoxy or phenyl, either substituted or unsubstituted. Preferred alkyl groups are the $C_1$ to $C_4$ alkyl groups, examples of which are methyl, ethyl, propyl, isopropyl, and n-butyl. Preferred alkenyl groups are $C_2$ to $C_4$ alkenyl groups, examples of which are vinyl, allyl, and 2-butenyl. Examples of alkoxy groups are the alkoxy analogs of the examples of alkyl groups listed above. Examples of substituted alkyl groups, substituted alkenyl groups, substituted alkoxy groups, and substituted phenyl groups are those bearing one or more hydroxy substituents, one or more halogen substituents, and those bearing both. Preferred halogen substituents are chlorine and bromine. Specific silsesquioxanes of particular interest are polymethylsilsesquioxane, polyphenylmethylsilsesquioxane, polyphenylpropylsilsesquioxane, polyphenylsilsesquioxane, polyphenyldimethylsilsesquioxane, and polyphenylvinylsilsesquioxane. The value of n can vary widely and is not critical. In most cases, n will fall within the range of 2 to 12, although curable polymers with values higher than 12 can also be used.

One source among others in the industry for silsesquioxanes are General Electric Company, Silicone Products Division, Waterford, N.Y., U.S.A. Typical silsesquioxanes obtained from this source are hydroxy-terminated polyphenylmethylsilsesquioxanes bearing the designations "SR240" and "SR165" and methoxy-terminated polymethylsilsesquioxanes bearing the designations "TPR178" and "TPR179." A presently preferred silsesquioxane for purposes of the present invention is "SR240."

One or more catalysts are frequently included in the binder formulation, and conventional catalysts for the particular binder can be used. Useful catalysts for silicone polymers include metal 2-ethyl hexanoates, metal naphthenates, metal linoleates and metal oleates, as well as certain quaternary phosphonium catalysts. Examples of metal 2-ethyl hexanoates are cobalt, manganese, iron, lead, zirconium, zinc, bismuth, vanadium, potassium, strontium and lithium 2-ethyl hexanoates. Examples of metal naphthenates are cobalt, manganese, calcium, iron, zirconium and zinc naphthenates. Preferred catalysts for silsesquioxanes are tetrabutylphosphonium acid acetate (available from General Electric Company under the designation "SRC-11") and zirconium 2-ethyl hexanoate. Catalysts are used in catalytic amounts which will be readily apparent to those skilled in the use of curing catalysts.

An optional component of the binder formulation is a co-binder, which is a heat-curable polymer that cures at a lower temperature than the principal binder and thereby permits a two-stage curing procedure. Curing of the co-binder alone in the first stage provides stability and ease of handling to the binder formulation, which is useful in situations where it is otherwise difficult to contain the binder or to form activated carbon particles into a desired shape prior to complete curing. Suitable co-binders are water-insoluble polymers curing at temperatures lower than the principal binder curing temperature by a difference of about 20 degrees to about 100 degrees (Celsius). In binder formulations in which the principal binder is a silsesquioxane, a preferred co-binder is polyvinyl acetate, and useful forms of this co-binder are commercially available from Union Carbide Corporation, Danbury, Conn., U.S.A., for example those under the designation "UCAR® 379" and "UCAR® 350."

In certain embodiments of this invention, the binder or binder combination is formulated as an oil-in-water emulsion, and the emulsion is often most easily formed by first dissolving the polymer(s) in a organic solvent that forms a separate phase with water. The emulsion form is particularly useful in embodiments involving the preparation of a carbon slip in which the uncured binder is combined with activated carbon particles, then placed in contact with a thermally conductive substrate and cured in place. The solvent is preferably a non-polar organic solvent, particularly hydrocarbons such as alkanes, alkenes and aromatics. In other embodiments of the invention, particularly those in which the binder formulation is used to bond a preformed coherent body of fused or otherwise bonded activated carbon particles (which could be a mass of activated carbon particles bonded to a shaped open lattice-type or finned substrate structure) to a continuous planar or contoured substrate surface, the binder or binder formulation may be used effectively as an organic solution without an aqueous phase. In either case, preferable organic solvents are those having boiling points of less than about 150° C. at atmospheric pressure, and most preferably less than about 120° C. at atmospheric pressure. A presently preferred solvent is toluene, and for silsesquioxane binders, best results are often achieved with toluene: silsesquioxane weight ratios ranging from about 1:3 to about 2:1.

When an aqueous emulsion is used, emulsifying agents, rheological aids or both can also be included as further options. Useful emulsifying agents include anionic surfactants, nonionic surfactants, cationic surfactants, and amphoteric surfactants. The optimal choice will vary with the binder and will be readily apparent to those skilled in the art. Anionic surfactants are generally preferred. Surfactant quantities can vary widely depending on need. In most cases, surfactants when used will be present in amounts ranging from about 0.01% to about 1.0% by weight.

The aqueous phases of aqueous emulsions used in this invention may also contain further additives as commonly used in binder formulations. One class of additives are thickeners to control the fluidity of the slip, and impart strength to the slip or to the partially cured compositions or structures in the case of slips formulated for two-stage curing. Conventional thickeners may be used, such as for example methyl cellulose, which is available from Aldrich Chemical Company Inc. (Milwaukee, Wis., U.S.A.); methyl cellulose ether, which is available from The Dow Chemical Company (Midland, Mich., U.S.A.); and polyacrylic acid, which is available from B. F. Goodrich Co. (Akron, Ohio, U.S.A.) under the designations "CARBOPOL® ETD 2691" and "CARBOPOL® 674." The amounts used will most often vary between about 0.01% and 10% by weight of the emulsion, and preferably from about 0.03% to about 3% by weight.

In some cases, thinners will be useful for inclusion in the emulsion or slip mixture. Suitable thinners are typically surfactants and include, but are not limited to, naphthalene sulfonates, available from W. R. Grace and Co. (Boca Raton, Fla., U.S.A.) under the designation "DAXAD® 19-L; " 2,4,7,9-tetramethyl-5-decyne-4,7-diol, available from Air Products and Chemicals, Inc. (Allentown, Pa., U.S.A.), under the designation "SURFYNOL® GA; " trisodium phosphate; and sodium lauryl sulfate.

In some cases as well, particularly those involving the formation of a carbon slip to be cured in place against a substrate, it may be desirable to include fillers in the formulation to impart specific characteristics or properties to the shaped or cured structure. A common filler useful in this regard is chopped carbon fibers, such as those available from Amoco Corporation under the designation "THORNEL® T-300." Fillers can be present in amounts up to about 25% by weight, and preferably from about 0.1% to about 5% by weight of the cured and dried carbonaceous material.

The weight ratio of organic to aqueous phases in binder emulsions will be selected to minimize the amount of organic solvent used and yet to provide the desired consistency and other fluid properties of the binder formulation. In most applications, best results will be obtained at organic:aqueous weight ratios ranging from about 1:10 to about 1:100, preferably from about 1:20 to about 1:50, and most preferably from about 1:25 to about 1:35.

In embodiments involving the formation of a carbon slip from a binder emulsion, the carbon particles are preferably wetted with water before being combined with any further ingredients. This will fill most of the pores, and preferably substantially all of the pores, with water prior to contact of the carbon with any organic phases. Sufficient water will preferably be added to provide a carbon slurry having a paste-like or dough-like consistency. If necessary, a thickener can be added at this point to further control the consistency of the slurry.

The proportion of carbon relative to the polymeric binder in the carbon slip can vary depending on the desired qualities of the cured product, the operating conditions and the procedural steps leading to the cured product. In most cases, the weight ratio of carbon to binder will be from about 1:1 to about 30:1, and preferably from about 5:1 to about 20:1.

In embodiments of the invention involving the bonding of activated carbon particles to a thermally conductive solid support by curing a carbon slip in place, the solid support may assume any of various physical configurations designed for purposes of transferring heat to and from the activated carbon as the working fluid condenses and evaporates. Examples of such configurations are flat or contoured surfaces such as the inner or outer surfaces of fluid transfer pipes or other vessels, fins projecting from flat or contoured surfaces, and open lattice-type, mesh or open-cell structures welded or otherwise bonded to flat or contoured surfaces. Foamed metals are an example of open lattice-type structures. Such structures may be bonded to flat or contoured surfaces prior to being loaded with carbon slip and subsequently cured, but the preferred method is to load open lattice-type structures with carbon slip, followed by drying and curing to obtain a monolithic carbonaceous body. This body is then bonded to the flat or contoured mating surface by embodiments of the invention using the binder formulation as an adhesive, as described below.

Examples of thermally conductive material are metals, metal alloys, ceramics, composite metals such as laminated metals, and composites of metals with other materials such as metallized ceramics. A preferred group of materials is aluminum-based metals (such as aluminum and aluminum alloys), copper-based metals (such as copper and copper alloys), stainless steels, aluminized steel, and aluminized ceramic. Aluminum and stainless steel are more preferred, with aluminum the most preferred.

In the presently preferred practice of this invention, one illustrative carbon slip formulation is as follows. The silsesquioxanes product SR240 is supplied as a 50% (by weight) solution in toluene.

| | |
|---|---|
| activated carbon (Amoco PX-21, dried) | 50 g |
| vinyl acetate emulsion (50% solids) | 3 g |
| water addition | 30 g |
| aqueous methyl cellulose solution (0.5 weight %) | 20 g |
| toluene | 20 g |
| catalyst (GE SRC-11) | 50 µL |
| silsesquioxanes (GE SR240) | 10 g |
| (dissolved with the catalyst in the toluene and emulsified in a solution of 1 mL SURFYNOL ® GA surfactant in 180 mL water) | |

An alternate carbon slip formulation using a different activated carbon is as follows:

| | |
|---|---|
| activated carbon (Kansai MAXSORB 2400, <3 weight % water) | 150 g |
| vinyl acetate emulsion (UCAR ® 350) | 9 g |
| naphthalene sulfonate (DAXAD ®) | 1.5 g |

-continued

| | |
|---|---|
| aqueous methyl cellulose solution (0.5 weight %) | 120 g |
| catalyst (GE SRC-11) | 0.3 g |
| silsesquioxanes (GE SR240) (mixed with catalyst and emulsified in 350 g of a 0.6 weight % aqueous solution of SURFYNOL ® GA surfactant) | 30 g |

The binder formulation will be in liquid form, and will include an inert liquid serving as a carrier or solvent for the uncured binder. The inert liquid will be one that boils at a temperature below the cure temperature of the binder when the formulation is at least partially evacuated to achieve an atmosphere of subatmospheric pressure (i.e., less than 14.7 pounds per square inch absolute pressure, or less than $1.013 \times 10^5$ pascals). The binder formulation may be a suspension, emulsion or solution, and is preferably a solution, and the inert liquid is preferably an organic solvent bearing the same description and scope as that of the embodiments discussed above. The solvent is preferably one which has a boiling point of less than about 150° C. at atmospheric pressure, and most preferably one which has a boiling point of less than about 120° C. at atmospheric pressure.

The polymeric binder content of the binder formulation can vary widely depending on the degree of agitation needed from the boiling and on the consistency of the formulation. In most applications, best results will be obtained with a binder formulation having at least about 50% binder by weight, and preferably from about 70% to about 90% binder by weight. One illustrative formulation for this embodiment is as follows:

| | |
|---|---|
| catalyst (GE SRC-11) | 0.3 g |
| silsesquioxanes (GE SR240) | 60 g |

In these embodiments of the invention, the binder formulation is placed in the gap between the coherent carbonaceous body and the substrate. The pressure is then lowered and the components are heated to cause the inert liquid to boil off at a temperature well below the cure temperature of the binder. The boiling action creates sufficient agitation of the binder formulation to distribute the binder uniformly throughout the contact regions, thereby ensuring full contact between the facing surfaces of the solid parts through the binder. As the inert liquid boils off, the binder formulation thickens which substantially prevents the uncured binder from penetrating into the pore structure of the carbonaceous body, while still permitting full escape of the volatilized liquid carrier or solvent through the pores. Curing of the binder can occur at the same time or in a subsequent step at a higher pressure, higher temperature or both. The lowered pressure during the boiling stage is preferably an absolute pressure of less than about 0.5 atmosphere ($5.07 \times 10^4$ pascals), and more preferably less than about 0.1 atmosphere ($1.0 \times 10^4$ pascals). The temperature during the boiling stage is preferably about 200° C. or below, and more preferably about 100° C. or below, followed by a curing step at a temperature of at least about 125° C.

EXAMPLE

This example compares the use of a carbon slip in accordance with the present invention with one formed as an organic suspension in accordance with the prior art. This example is offered only for purposes of illustration, and is not intended to limit the invention. The organic suspension used in these experiments is representative of the disclosure in Jones et al., U.S. Pat. No. 5,388,637, issued Feb. 14, 1995.

The carbon slip serving as representative of the present invention was that listed above as the alternate carbon slip, containing MAXSORB 2400 activated carbon, UCAR 350 vinyl acetate, napthalene sulfonate, methyl cellulose, SRC-11 catalyst and GE SR240 silsesquioxanes, an aqueous emulsion in the proportions indicated. For the carbon slip representing the prior art, two resol formulations were used, each using a resol identified as PLYOPHEN® 43243 phenolic resin (a product of Occidental Chemical Corporation, Durez Engineering Materials, Dallas, Tex., U.S.A.). The two resol formulations were as follows (each also using MAXSORB 2400 activated carbon):

TABLE I

| Component | Resol-1 | Resol-2 |
|---|---|---|
| MAXSORB 2400 (g) | 20 | 20 |
| Isopropyl alcohol (g) | 115 | 85 |
| Resol (g) | 40 | 20 |
| Activated carbon solids fraction | 0.42 | 0.59 |

The resol carbon slips once prepared were placed in disk molds and dried at about 40° C. in a vacuum oven. This was followed by heating at a temperature rise rate of about 100° C. per hour in an argon atmosphere up to 600° C. where the temperature was held for one hour. Two resol disks were prepared in this manner. Two castings representing the present invention were prepared by impregnating aluminum foam with the SR240 carbon slip, drying at 90° C. and curing at about 150° C. for one hour, followed by a vacuum bake at about 250° C. for two hours. The adsorption capacities of the two resol disks and the two SR240 castings, as well as that of MAXSORB 2400 activated carbon itself (in powder form), were determined by thermogravimetric analyses. The analyses were performed on 20 mg portions taken from the disks and castings, by exposing these portions to a sorbate gas, fluorocarbon refrigerant R134a (designation assigned by the American Society of Heating, Refrigerating, and Air Conditioning Engineers, Atlanta, Ga., U.S.A.). The sorbate gas was flowed past a sample and vented while the sample was thermally cycled between about 100° F. and about 400° F. The adsorption capacity is defined as the mass difference between the two temperature extremes divided by the sample mass at the upper temperature.

The results are presented in Table II below, which lists the activated carbon solids fraction for each sample and the adsorption capacity in mg per grams of activated carbon.

TABLE II

| Sample (identified by binder formulation) | Activated Carbon Solids Fraction | Adsorption Capacity (mg/g carbon) |
|---|---|---|
| Prior Art Organic: Resol-1 | 0.42 | 524 |
| Prior Art Organic: Resol-2 | 0.59 | 606 |
| Invention Emulsion: Sample 1 | 0.87 | 683 |
| Invention Emulsion: Sample 2 | 0.87 | 687 |
| Unbonded Activated Carbon | (1.00) | 785 |

The results in Table II indicate that the samples bonded by the binder applied as an aqueous emulsion retained nearly their full carbon capacity (by comparing the adsorption capacities of these samples with that of the unbonded activated carbon), whereas the samples bonded by the organic binder system lost a substantial amount of their adsorption capacity.

The foregoing is offered primarily for purposes of illustration. It will be readily apparent to those skilled in the art that the materials, proportions, operating conditions, procedural steps and other parameters of the invention in all of its aspects may be further modified or substituted in various ways without departing from the spirit and scope of the invention.

What is claimed is:

1. A method for binding particles of activated carbon to a thermally conductive solid support without substantially reducing the absorptive capacity of said activated carbon, said method comprising:
   (a) combining said particles with an emulsion to form a carbon slip, said emulsion consisting of a nonaqueous phase dispersed in a continuous aqueous phase, said nonaqueous phase comprising a polymeric binder which is heat-curable and substantially insoluble in water;
   (b) placing said carbon slip in contact with said solid support; and
   (c) heating said carbon slip while in contact with said solid support, to cure said polymeric binder and to evaporate substantially all water in said slip, thereby binding said activated carbon to said solid support.

2. A method in accordance with claim 1 in which said solid support is an open-lattice structure.

3. A method in accordance with claim 1 in which said solid support is an array of fins.

4. A method in accordance with claim 1 in which said solid support is a member selected from the group consisting of metals, metal alloys, composite metals and metallized ceramics.

5. A method in accordance with claim 1 in which said solid support is a member selected from the group consisting of aluminum, aluminum alloys, copper, copper alloys, stainless steels, aluminized steel, and aluminized ceramic.

6. A method in accordance with claim 1 in which said solid support is a member selected from the group consisting of aluminum and stainless steel.

7. A method in accordance with claim 1 in which said solid support is aluminum.

8. A method in accordance with claim 1 in which said polymeric binder is a silicone binder curable at a temperature below about 250° C., and (c) comprises heating said carbon slip to a temperature below about 250° C.

9. A method in accordance with claim 1 in which said polymeric binder is a silicone binder curable at a temperature within the range of from about 125° C. to about 225° C., and (c) comprises heating said carbon slip to a temperature within said range.

10. A method in accordance with claim 1 in which said polymeric binder is a silicone binder curable at a temperature within the range of from about 150° C. to about 200° C., and (c) comprises heating said carbon slip to a temperature within said range.

11. A method in accordance with claim 1 in which (a) comprises combining said particles with said emulsion in amounts selected to achieve a carbon-to-polymeric binder weight ratio of from about 1:1 to about 30:1.

12. A method in accordance with claim 1 in which (a) comprises combining said particles with said emulsion in amounts selected to achieve a carbon-to-polymeric binder weight ratio of from about 5:1 to about 20:1.

13. A method in accordance with claim 1 in which said polymeric binder is a silsesquioxane binder.

14. A method in accordance with claim 13 in which said silsesquioxane binder is a member selected from the group consisting of polymethylsilsesquioxane, polyphenylmethylsilsesquioxane, polyphenylpropylsilsesquioxane, polyphenylsilsesquioxane, polyphenyldimethylsilsesquioxane, and polyphenylvinylsilsesquioxane.

15. A method in accordance with claim 13 in which said silsesquioxane binder is a hydroxy-terminated polyphenylmethylsilsesquioxane.

16. A method in accordance with claim 1 in which said nonaqueous phase further comprises a polymeric co-binder curable at a temperature substantially lower than said polymeric binder, and (c) comprises heating said carbon slip in two stages, including a low-temperature stage to cure said polymeric co-binder and a high-temperature stage to cure said polymeric binder.

17. A method in accordance with claim 16 in which said polymeric co-binder is a vinyl acetate polymer.

18. A method in accordance with claim 1 in which said nonaqueous phase further comprises a water-immiscible hydrocarbon solvent.

19. A method for bonding a microporous monolithic carbonaceous body to a thermally conductive substrate, said method comprising:
   (a) coating said carbonaceous body along a binding surface thereof with a liquid mixture of a heat-curable polymeric binder and a non-curable organic liquid species having a boiling point below about 200° C., and placing said bonding surface thus coated in contact with said thermally conductive substrate; and
   (b) heating said carbonaceous body thus coated and while in contact with said thermally conductive substrate in an atmosphere of subatmospheric pressure to boil off at least a portion of said non-curable organic liquid species; and
   (c) heating said heat-curable polymeric binder to effect curing thereof.

20. A method in accordance with claim 19 in which said atmosphere of (b) is less than 0.5 atmosphere.

21. A method in accordance with claim 19 in which said atmosphere of (b) is less than 0.1 atmosphere.

22. A method in accordance with claim 19 in which said non-curable organic liquid species has a boiling point of less than about 150° C. at atmospheric pressure.

23. A method in accordance with claim 19 in which said non-curable organic liquid species has a boiling point of less than about 120° C. at atmospheric pressure.

24. A method in accordance with claim 19 in which (b) comprises heating to a temperature of about 200° C. or below.

25. A method in accordance with claim 19 in which (b) comprises heating to a temperature of about 100° C. or below, and (c) comprises heating to a temperature of at least about 125° C.

26. A method in accordance with claim 19 in which said non-curable organic liquid species is a solvent, and said liquid mixture is a solution of said heat-curable polymeric binder in said solvent.

27. A method in accordance with claim 19 in which said non-curable organic liquid species has a boiling point of less than about 120° C. at atmospheric pressure, said atmosphere of (b) is less than 0.1 atmosphere, and (b) comprises heating to a temperature or about 100° C. or below.

28. A method in accordance with claim 26 in which said heat-curable polymer binder comprises at least about 50% by weight of said solution.

29. A method in accordance with claim 26 in which said heat-curable polymer binder comprises from about 70% to about 90% by weight of said solution.

30. A method in accordance with claim 19 in which said heat-curable polymeric binder is a silicone binder.

31. A method in accordance with claim 30 in which said silicone binder is a silsesquioxane binder.

32. A method in accordance with claim 30 in which said silicone binder is a member selected from the group consisting of polymethylsilsesquioxane, polyphenylmethylsilsesquioxane, polyphenylpropylsilsesquioxane, polyphenylsilsesquioxane, polyphenyldimethylsilsesquioxane, and polyphenylvinylsilsesquioxane.

33. A method in accordance with claim 30 in which said silicone binder is a hydroxy-terminated polyphenylmethylsilsesquioxane.

* * * * *